United States Patent
Yamada et al.

(10) Patent No.: US 6,728,811 B2
(45) Date of Patent: Apr. 27, 2004

(54) INPUT/OUTPUT DEVICE FOR CONNECTION AND DISCONNECTION OF ACTIVE LINES

(75) Inventors: Tsutomu Yamada, Hitachi (JP); Kenichi Kurosawa, Hitachi (JP); Yasuo Kaminaga, Hitachi (JP); Kouji Masui, Hitachi (JP); Akihiro Ohashi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/141,067

(22) Filed: May 9, 2002

(65) Prior Publication Data

US 2002/0133660 A1 Sep. 19, 2002

Related U.S. Application Data

(63) Continuation of application No. 09/932,973, filed on Aug. 21, 2001, now Pat. No. 6,393,509, which is a continuation of application No. 09/499,897, filed on Feb. 8, 2000, now Pat. No. 6,289,407, which is a continuation of application No. 09/043,517, filed on Mar. 23, 1998, now Pat. No. 6,038,615.

(51) Int. Cl.[7] .............................................. G06F 13/00
(52) U.S. Cl. ..................................... 710/300; 710/302
(58) Field of Search ................................ 710/300–306

(56) References Cited

U.S. PATENT DOCUMENTS

| | | | |
|---|---|---|---|
| 4,079,440 A | 3/1978 | Ohnuma et al. ............. 361/816 |
| 5,272,584 A | 12/1993 | Austruy et al. ................ 361/58 |
| 5,317,697 A | 5/1994 | Husak et al. ................ 710/103 |
| 5,434,752 A | 7/1995 | Huth et al. .................... 70/217 |
| 5,446,848 A | * 8/1995 | Whitlock et al. ............ 710/100 |
| 5,530,810 A | 6/1996 | Bowman |
| 5,555,510 A | 9/1996 | Verseput |
| 5,958,033 A | * 9/1999 | Schubert et al. ............. 710/300 |
| 5,974,490 A | 10/1999 | Fujimura et al. ............ 710/103 |
| 5,983,298 A | 11/1999 | Schultz et al. ............... 710/103 |
| 6,038,615 A | 3/2000 | Yamada et al. ................ 710/2 |
| 6,105,091 A | * 8/2000 | Long .......................... 710/302 |

FOREIGN PATENT DOCUMENTS

JP     405204507 A     8/1993

* cited by examiner

*Primary Examiner*—Paul R. Myers
(74) *Attorney, Agent, or Firm*—Antonelli, Terry, Stout & Kraus, LLP

(57) ABSTRACT

There is provided an input/output device having of not exerting any adverse influence on other expansion devices connected to a system bus at the time of insertion or removal.

An expansion device 800 comprises an electronic circuit 400 and a MOS switch 300, and is connected to a system bus (BUS) via a connector having long and short pins. The expansion device 800 two power supply systems, namely a stable power supply 250 and an unstable power supply 260. At the time of insertion or removal of the expansion device 800, power is provided to the MOS switch 300 and a high impedance maintaining circuit from the stable power supply via a pair of long pins, so as to reliably place the MOS switch 300 in a high impedance state, inside the expansion device the high impedance maintaining circuit 350 drives an open/close control terminal, and power is provided to the electronic circuit 400 from the unstable power supply 260. At the time of insertion or removal, adverse influence is not exerted on the signal transmission on the system bus, and effects of load variation on the main power supply are reduced.

4 Claims, 9 Drawing Sheets

INPUT/OUTPUT DEVICE FOR CONNECTION AND DISCONNECTION OF ACTIVE LINES

This is a continuation of application Ser. No. 09/932,973, filed Aug. 21, 2001 (now U.S. Pat. No. 6,393,509); which is a continuation of Ser. No. 09/499,897, filed Feb. 8, 2000 (now U.S. Pat. No. 6,289,407); which is a continuation of Ser. No. 09/043,517, filed Mar. 23, 1998 (now U.S. Pat. No. 6,038,615), the entire disclosures of which are hereby incorporated by reference.

TECHNICAL FIELD

The present invention relates to an input/output device for connection and disconnection of active lines, and particularly to a device for connecting and disconnecting other electronic circuit devices to and from a network of signal circuits operating independently of an operating system bus, without causing the operation of the system bus to stop.

BACKGROUND ART

In recent computer systems, as well as high speed and high performance processing devices, there has also been a demand for improvements in the transfer rate of a system bus which is the transmission path for the results of processing. Also, accompanying the diversification of systems, there has been an increasing necessity to connect electronic circuits having various functions mainly to the system bus. The roles played by computer systems have become much more serious, and in order to maintain expansion devices including the aforementioned electronic circuits, there is a tendency to not permit system stoppages, and a need has arisen to connect or disconnect these expansion devices using active lines. On the other hand, in shared bus system type configurations, there is also a need for a way of settling the bus signal waveform quickly, for each expansion device, in order to achieve high speed operation.

Conventionally, as disclosed in Japanese Patent Laid-open Publication No. Hei 5-12777 (which will be referred to as publication 1), there has been known a device in which power is supplied beforehand using a cord, etc., and disable control (open control) of bus drivers is carried out. As disclosed in Patent laid-open publication No. Hei 4-171520 (publication 2) a power supply and an open/close control line of a driver are connected to bus circuits by a long pin, while other bus signal lines are connected to the bus circuits by a short pin. At the time of insertion of a device, corruption of signals on the bus caused by the insertion is prevented by disabling the open/close signal line of the drivers in advance. However, in publication 1, the procedure of connecting the cord beforehand at the time of insertion or removal is complicated, while in publication 2 an open/close control line must be disabled beforehand. In either case, since it can not be guaranteed that the drivers will be disabled when insertion or removal is carried out carelessly, there is a possibility of problems arising such as the system crashing, for instance.

DISCLOSURE OF THE INVENTION

The object of the present invention is to provide an input/output device capable of connecting and disconnecting active lines, and particularly an input/output device in which the insertion or removal of expansion devices does not inhibit bus signal transfer of other electronic devices on a high speed bus due to a disabled state being maintained at the time of insertion or removal using transfer gates with small signal delay in the input output device.

Another object of the present invention is to provide an input/output device capable of connecting and disconnecting active lines, and particularly an input/output device in which the internal power supply systems of expansion devices are multiplexed, the influence on power supplies is reduced at the time of inserting or removing expansion devices, at the same time as ensuring that the maintaining of high impedance of internal parts of the expansion devices, particularly the input/output devices, does not become unreliable, and in which the operation of electronic circuits not involved with insertion or removal does not become unreliable.

Still another object of the present invention is to provide a method, related to an input/output device, that can be applied to a high speed bus to rapidly settle the bus operating waveform by arranging insertion of transfer gates at locations a fixed short distance from a bus at the input/output section of electronic circuits.

An input/output device of the present invention is connected to a plurality of electronic circuits and to a plurality of signal circuit networks having signal branch wires, these electronic circuit networks being arranged on printed circuit boards interconnecting the signal circuit networks and on separate expansion devices, the expansion devices having an input/output device power supply section for supplying power to the input output devices and being connected to the signal circuit networks through connectors including a pair of long pins that make initial contact at the time of insertion and are the last thing separated at the time of removal, and a pair of short pins that make contact after the long pins at the time of insertion, and are separated before the long pins at the time of removal, the input/output device power supply section being connected to a main power supply through the pair of long pins, the input/output device including a plurality of transfer gates, the transfer gates having two input/output terminals and an open/close control terminal, one of the input terminals of the plurality of transfer gates being connected to the plurality of signal branch wires through the pair of short pins while the other input terminal of the plurality of transfer gates is connected to the electronic circuits, and the open/close control terminal is connected to a positive or negative power supply of the input/output device power supply section inside the expansion devices, through a resistor.

Further, an input device of the present invention is characterized in that the open/close control terminals of the plurality of transfer gates are connected to a control device for carrying out open/close control of the transfer gates, through the pair of long pins.

The control device of the present invention drives the open/close terminal in synchronism with a reference signal used by the electronic circuits to extract signal of the signal circuit networks.

Further, the control device of the present invention has connection confirmation means for confirming whether or not the plurality of expansion devices are connected to the signal circuit networks, and at least one connection state register for establishing connection states of the plurality of expansion devices that have been identified by the connection confirmation means.

The control device of the present invention is further characterized in that it has an open/close control register, and open and close for each input/output device is controlled by writing open or closed information to a region of the open/close control register corresponding to each input/output device.

An expansion device of the present invention has an input/output device power supply section for supplying power only to the input/output device, and a circuit power supply section for supplying power to circuits other than the input/output device, the input/output power supply section being connected to a main power supply through a first pair of long pins, the circuit power supply section being connected to the main power supply or to a different reserve charge power supply through a second pair of long pins.

The expansion device of the present invention is further characterized in that it has an input/output device power supply section for supplying power only to the input/output device, and a circuit power supply section for supplying power to circuits other than the input/output device, the input/output power supply section being connected to a main power supply through a first pair of long pins, the circuit power supply section being connected to the main power supply through a second pair of long pins.

The expansion device of the present invention is further characterized in that it has an input/output device power supply section for supplying power only to the input/output device, and a circuit power supply section for supplying power to circuits other than the input/output device, the input/output power supply section being connected to a main power supply through a first pair of long pins, the circuit power supply section being connected to a capacitor through a second pair of long pins, the capacitor being charged by the main power supply.

Still further, the input/output device of the present invention is characterized in that the capacitor is charged from the main power supply through a resistor, or through a resistor and a diode.

Further, in the input/output device of the present invention, a circuit power supply section is connected to the main supply through a pair of short pins.

An expansion device of the present invention is characterized in that the input/output device power supply section and the circuit power supply section are wired onto a printed substrate for connecting the electronic circuits, between spaces where there is no wiring material.

The expansion device of the present invention is further characterized in that a pin on a connector for supplying power to the input/output device power supply section and the circuit power supply section are arranged with maximum separation on the connector.

The input/output device of the present invention is connected to a plurality of electronic circuits and to a plurality of signal circuit networks having signal branch wires, and includes a plurality of transfer gates. The transfer gates have two input/output terminals and an open/close control terminal. First signal branch wires connect one input/output terminal of the transfer gates and the signal circuit networks, while second signal branch wires connect the other input/output terminals of said plurality of transfer gates to the electronic circuits. The open/close control terminal of the transfer gates maintains a potential across the two input/output terminals to always maintain a conductive state. Reflected waves of the signal circuit networks are reduced by making the length of the first signal branch wires less than 1.5 inches, and distribution loss of the electronic circuits is reduced by making the length of the second signal branch wires less than 1.5 inches.

Since the present has the above construction, a disable signal is supplied to the open/close control terminal of the transfer gates at the same time as a stable power supply is provided to the transfer gates, even when expansion devices are inserted or removed, the input/output terminals of the transfer gates are maintained at high impedance, and it is possible to minimize the effects on the system bus at the time of insertion or removal.

Further, in the present invention, a reserve charge power supply other than the main power supply for supplying power to a plurality of expansion devices is prepared, and the power supply systems inside the expansion devices are arranged into stable power supply systems connected to a stable main power supply from initial insertion of the expansion devices and unstable power supply systems connected to the reserve charge power supply at the time of insertion of the expansion devices. From initial insertion of the expansion devices, by supplying power to transfer gates that require the input/output terminals to be reliably high impedance from the stable power supply systems and supplying power to charge a capacitive load existing in the expansion devices from the unstable power supply systems, it is possible to reduce the effects on the main power supply and to continue stable operation of other expansion devices currently operating on the system bus, even at the time of insertion or removal of the expansion devices. As long as the main power supply can supply power smoothly it can also serve as the reserve charge power supply.

Also, by inserting transfer gates at positions fixed short distances from a bus at the input output section of the electronic circuits, the effects of reflections of the transfer gates at the electronic circuit side can be absorbed by the transfer gates, bus signal multiplexed reflected waves can be attenuated in a short time, and the bus waveform can be settled rapidly.

BEST MODE FOR CARRYING OUT THE INVENTION

Figure 1A:
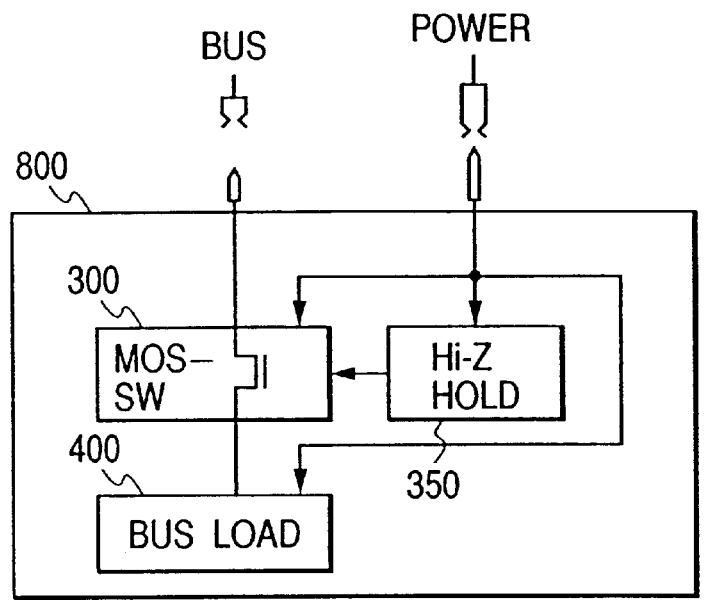
FIG. 1 is an overall drawing of one embodiment of the present invention, showing connection of a system bus and expansion devices.
Figure 1B:
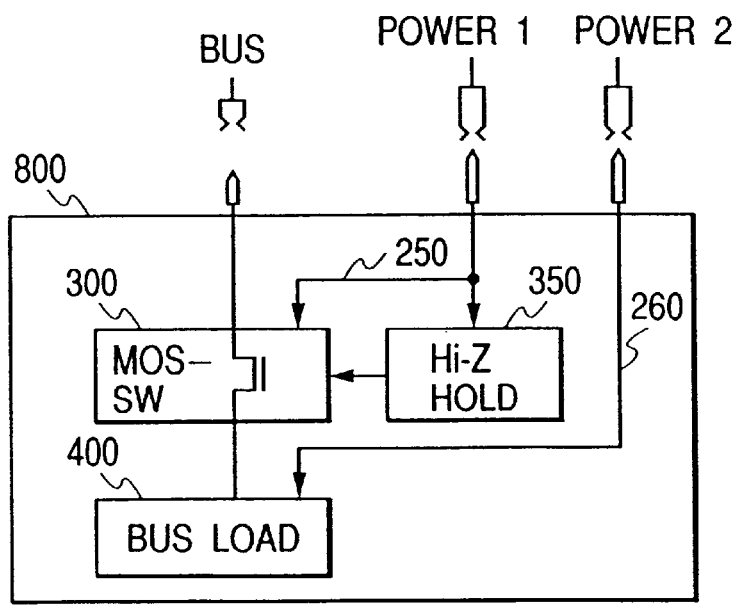
Figure 1C:
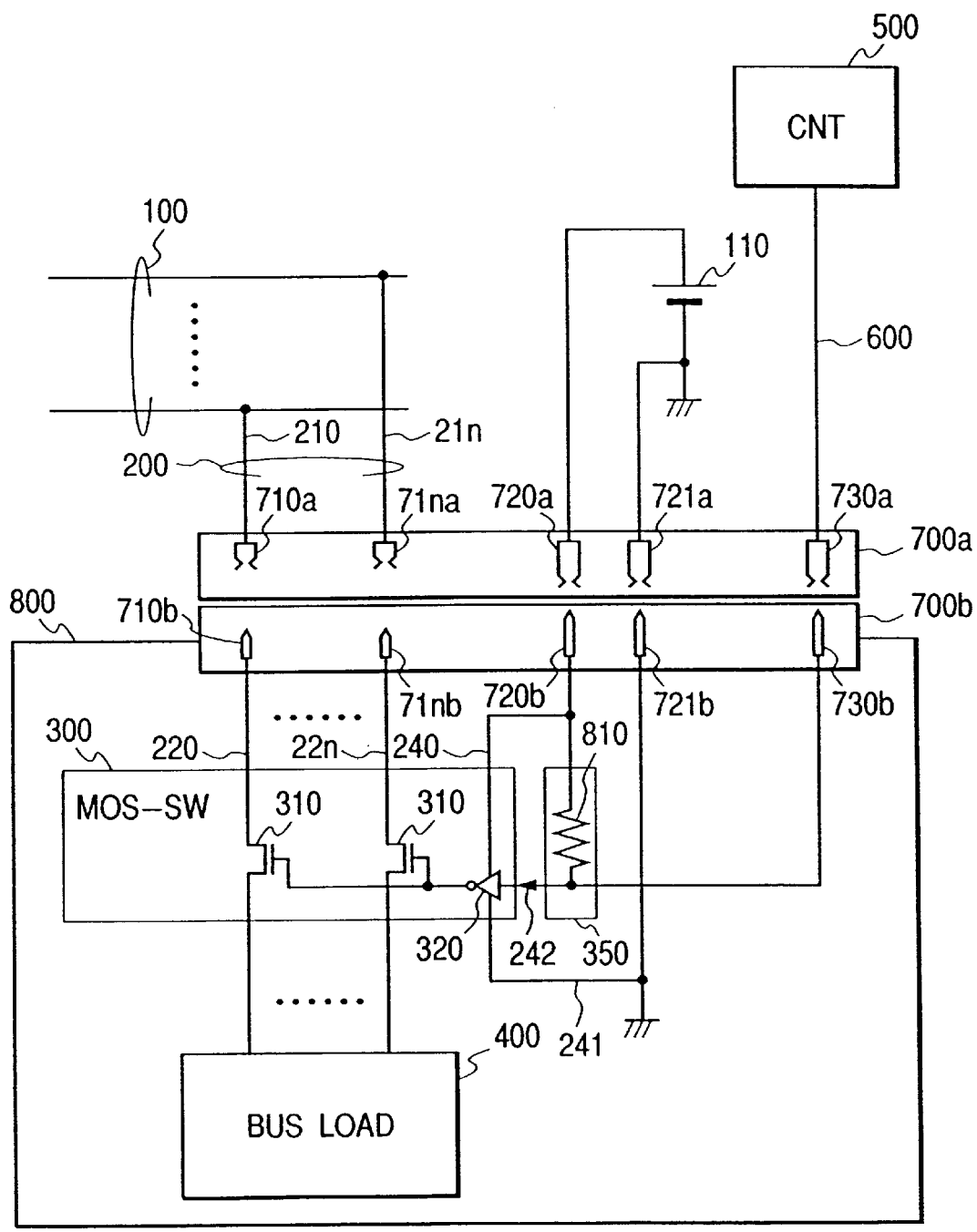

FIG. 1 is a functional block diagram of an input/output device realizing connection and disconnection of active lines in an embodiment of the present invention.

FIG. 1(a) shows an expansion device 800 connecting to a bus (BUS) and a power supply (POWER). The expansion device 800 includes a MOS switch 300 having a plurality of transfer gates, a high impedance maintaining circuit 350 (Hi-Z HOLD) for controlling high impedance to the MOS switch 300 when the expansion device 800 is inserted or removed, and an electronic circuit 400 (BUS LOAD) connecting to the bus for operation. Further, there is connection means for ensuring that the order of connection is the power supply followed by the bus when the expansion device 800 is inserted to the bus and power supply, and disconnecting in the order of the bus followed by the power supply when the expansion device is removed. In this case the connection means is shown as long and short pins.

The transfer gates are one type of MOS element. If the gate terminal of a MOS transfer gate is enabled (close control) a conducting state results across the source and drain terminals, while if the gate terminal is disabled, a high impedance state exists across the source and drain terminals. The transfer gates can be used as a crossbar switch, for example, for switching communication lines.

With respect to the power supply, all electronic circuit devices used on the bus circuit typically share a power supply. However, there is a danger of variations in power supply load at the time of insertion or removal of expansion devices causing instability in the operation of other electronic circuits. In order to improve reliability, there is a desire for power supply capacity to be larger than a regular load state, so as to keep fluctuations of the power supply to a steady value in the system, even when an expansion device is inserted or removed.

According to the embodiment of the present invention, it is possible to reduce the effects on an operating bus at the time of insertion or removal of an expansion device 800. Specifically, when an expansion device 800 is inserted, initially power is supplied to the expansion device 800, and the high impedance maintaining circuit 350 drives the signal lines of the MOS switch so as to put the MOS switch 300 in a high impedance state. After that, the MOS switch 300 that has been put in a high impedance state is connected to the bus, the bus and electronic circuits are connected by carrying out external enable control of the MOS switch 300 and the insertion operation is thus completed. When the MOS switch 300 and the bus to which an expansion device is being inserted are connected, the MOS switch 300 enables insertion of the expansion device 800 even to an operating bus because the high impedance state can be guaranteed and a capacitive load can be made small. FIG. 1(*b*) shows a power supply wiring example in order to allow the embodiment to function reliably. Specifically, if a power supply is initially connected to an electronic circuit 400 having a generally large capacitive load, the power supply fluctuates due to current surge caused by charging of the capacitive load and the operation of the MOS switch 300 can not be guaranteed. Also, in the event that another expansion device is sharing the power supply, there is a risk that any effects will be passed on to the operating bus. At least during the connection operation, power is supplied from a stable power supply POWER_1 to the MOS switch 300 and the high impedance maintaining circuit 350, while power is supplied to the electronic circuit 400 from a power supply POWER_2 that is different from POWER_1. By separating the power supply systems, the operation of putting the MOS switch 300 into a high impedance state can be guaranteed at the time of insertion of an expansion device 800, and also, by separating the power supply POWER_2 from a power supply used in normal operation the operation of other expansion devices is guaranteed.

Detailed examples of each of the functions will be given in the following. One embodiment of an input/output device realizing connection and disconnection of active lines according to the present invention will now be described below with reference to FIG. 1(*b*). FIG. 1(*c*) shows a system bus 100 having a plurality of signal lines, branching wires 200 from the system bus 100, a MOS switch 300 (MOS-SW), an electronic circuit 400 (BUSLOAD) operating by connection to the bus, a control device 500 (CNT) for open/close controlling the MOS switch 300, a line 600 for open/close control of the MOS switch 300, an expansion device 800 separate from a printed substrate for wiring of the system bus 100, a resistor 810 on the expansion device 800 and connected to a negative open/close control terminal 242 of the MOS switch 300, connectors 700*a*, 700*b* for connecting the expansion device 800 to the system bus 100, and a main power supply 110 for supplying power to the expansion device 800. A plurality of expansion devices 800 are preferably connected to the system bus 100, and in this embodiment an expansion device 800 will be referred to instead of a plurality of expansion devices 800.

The connectors 700*a*, 700*b* have a pair of long pins that make contact first when an expansion device 800 is inserted and break contact last when it is being removed, and a pair of short pins that make contact later than the long pins when the expansion device is being inserted and break contact before the long pins when the expansion device is being removed.

The MOS switch 300 includes a plurality of transfer gates 310 and a driver 320 for driving the gates of the transfer gates 310. The transfer gates 310 are connected to the electronic circuit 400 and also respectively connected to the branch wires 210~21*n*, through the pairs of short pins (710*a*~71*na*, 710*b*~71*nb*). The driver 320 is supplied with power from a positive power supply section 240 and a negative power supply section 241 for the input/output device. The positive power supply section 240 and a negative power supply section 241 for the input/output device are connected to a stable main power supply 110 through the long pin pairs (720*a*~721*a*, 720*b*~721*b*) One end of the resistor 810 is connected to the open/close control terminal 242 while the other end is connected to the positive power supply section 240 for the input/output device that is provided with power from the main power supply 110 through the long pin pair (720*a*, 720*b*). The open/close control terminal 242 is connected to the short pin pair (730*a*, 730*b*) and also to the controller 500 through the control line 600. The resistance value of the resistor 810 is preferable made large so as to make it possible to drive the control line 600 from the controller 500 within a sufficiently small time compared to the operating cycle of the system bus.

In order for the electronic circuit 400 to transmit a signal to the system bus 100, the controller 500 must enable respective transfer gates 310 inside the MOS switch 300, by making the control line 600 a "logical negative potential" (this will hereinafter be simply referred to as LOW, and similarly a "logical positive potential" will be referred to as HIGH). As a result of this, the electronic circuit 400 is connected to the system bus 100, and can transmit signal to other electronic devices connected to the system bus 100.

The technical concept of the present invention is to guarantee a high impedance state of input/output lines 220~22*n* at the time an expansion device 800 is inserted, without the intervention of the controller 500, by securing the power supply of the MOS switch 300 and the potential of the open/close control terminal before the input/output lines 220~22*n* are connected.

In order to do this, means are required for guaranteeing operation of the MOS switch 300 and the open/close control terminal before the input/output lines 220~22*n* are connected, and in this embodiment it is intended to guarantee the connection sequence of the power supply and signal lines using a connector having long pins, to give stable operation of the MOS switch 300.

It will now be described how insertion or removal of an expansion device 800 without adversely affecting the system bus 100 is realized.

When an operator inserts an expansion device 800a positive voltage of the stable main power supply 110 is initially supplied to the positive power supply section 240 for the input output device from the pair of long pins (720a, 720b), and at the same time a negative voltage of the stable main power supply is provided to the negative power supply section 241 from the pair of long pins (721a, 721b). At this time, since HIGH is applied to the open/close control terminal 242 of the MOS switch 300 through the resistor 810, the MOS switch 300 secures the power supply and is in a disabled state, while the input/output lines 220~22n are guaranteed in a high impedance state. If an expansion device 800 is inserted, the high impedance state input/output lines 220~22n and the branch wires 210~21n are connected through the short pin pairs (710a~71na, 710b~71nb). After all the pins of the connector 700a and connector 700b have been connected, the controller 500 drives the open/close control terminal 242 LOW via the control line 600, and the electronic circuit 400 and the system bus 100 are connected. Because of the above described structure, since the input/output lines 220~22n of the MOS switch 300 are guaranteed to be in a high impedance state when the expansion device 800 is inserted, the influence of load variation passed to the system bus is only slight.

Next, in the event that an operator removes an expansion device 800, the operator first of all supplies an instruction to the controller before removal, the open/close control terminal 242 is driven HIGH through the control line 600, and the electronic circuit 400 and the system bus 100 are disconnected. The expansion device 800 is pulled out with the MOS switch 300 being secured in a disabled state, and first of all the short pin pairs (710a~71na, 710b~71nb) connected to the branch wires 210~21n, and the short pin pairs (730a, 730b) connected to the control line 600 are disconnected. Even after the plurality of short pin pairs have been disconnected, the input output lines 220~22n of the MOS switch 300 are guaranteed to be in a high impedance state because of the power supply provided from the long pin pairs (720a~721a, 721a~721b) and the resistor 810 joined to the power supply. Finally, the long pin pairs (720a~721a, 72ob~721b) are disconnected, and removal is complete. Similarly to the case when an expansion device 800 is inserted, since the input/output lines 220~22n of the MOS switch 300 are guaranteed to be in a high impedance state when the expansion device 800 is removed, the influence of load variation passed to the system bus is only slight.

Figure 2:
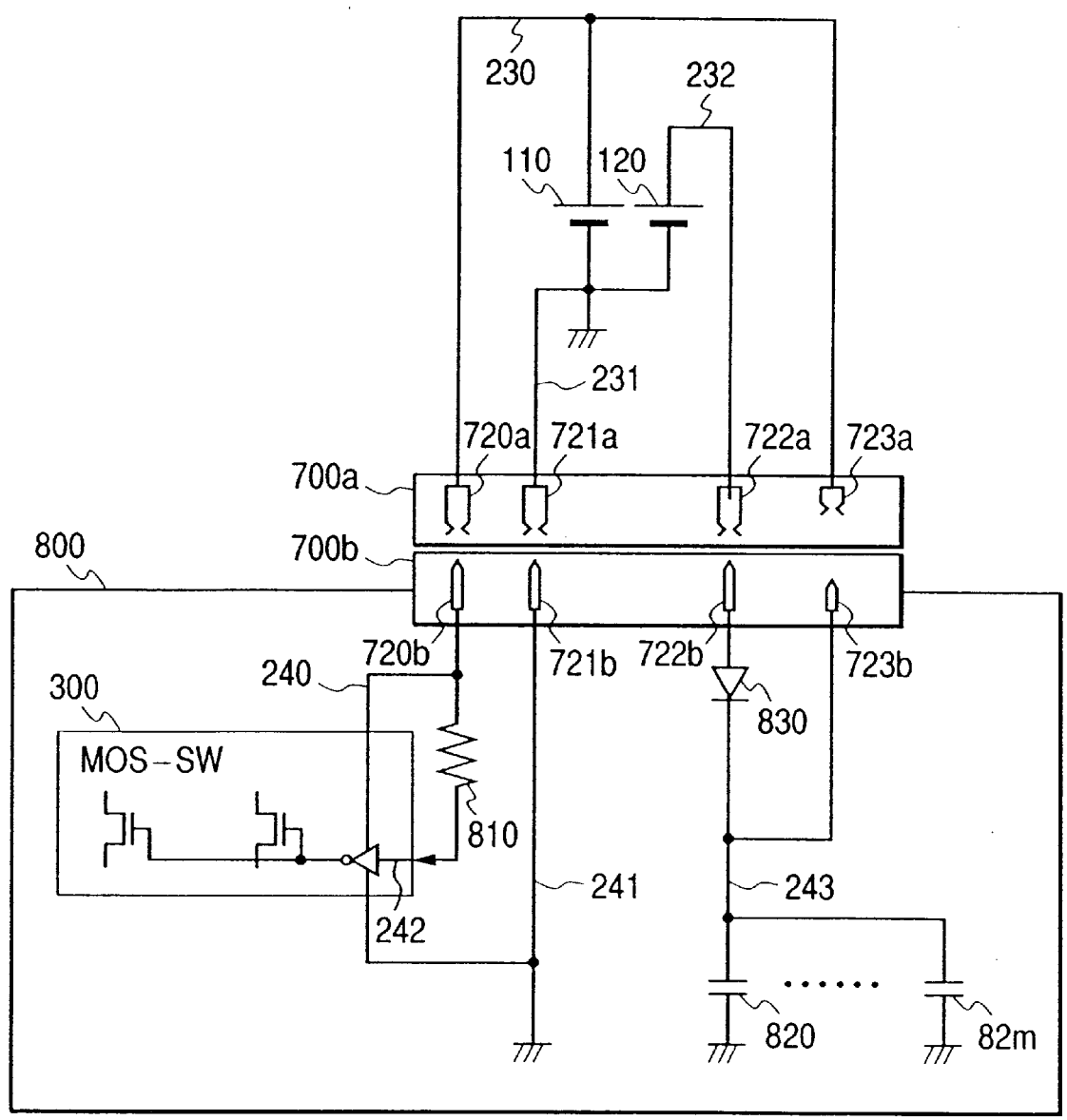
FIG. 2 shows one embodiment of an input output device supplying power to an expansion device.

FIG. 2 is a diagram showing an input/output device realizing connection and disconnection of active lines, and particularly an input/output device providing power to an expansion device, used in the embodiment of the present invention.

As well as the structural elements shown in FIG. 1, FIG. 2 shows a reserve charge power supply 120, circuit loads 820~82m that represent a load of an expansion device 800 included in an electronic circuit 400, and a circuit power supply section 243 for providing direct power only to the circuit loads 820~82m from the reserve charge power supply 120 through the pair of long pins (722a, 722b).

The technical concept of the present invention is to guarantee the power supply the MOS switch 300, so that input/output lines are reliably put in a high impedance state, preventing, as much as possible, effects caused by load fluctuations being passed to a main power supply 110 from which expansion devices other than those currently operating are receiving power, at the time the expansion device 800 is inserted or removed. In this embodiment, which is intended to achieve the above, there is shown an example in which a positive power supply section 240 for an input/output device (MOS switch 300) and a positive power supply section (in this case the circuit power supply section 243) for devices other than the input/output device are separated within the expansion device 800, and power is supplied to the input/output device positive power supply section 240 from the main power supply 110, while power to the circuit power supply section 243 is provided from the reserve charge power supply 120.

A connection is made from the reserve charge power supply 120 to the circuit power supply section 243 through the pair of long pins (722a, 722b) and a diode 830. A connection is also made from the main power supply 110 to the circuit power supply section 243 through the pair of short pins (723a, 723b), bypassing the diode 830.

The manner in which adverse effects caused by load variations are prevented from being passed to the main power supply 110 when an expansion device 800 is inserted or removed will be explained in the following.

When an operator inserts an expansion device 800, power is provided to the MOS switch 300 from the stable main power supply 110 through the long pin pairs (720a~721a, 720b~721b). Keeping the input/output lines of the MOS switch 300 disabled using the stable main power supply is done in the same way as has already been described above. At the same time, power is also provided from the reserve charge power supply 120 to the circuit power supply section 243 through the pair of long pins (722a, 722b) and the diode 830. In this case, the reserve charge power supply 120 carries out reserve charging of the circuit loads 820~82m. If an expansion device 800 is inserted, power is supplied to the circuit power supply 243 from the main power supply 110 by the pair of short pins (723a, 723b), and insertion of the expansion device 800 is thus completed.

Next, when an operator removes an expansion device 800, first of all the short pin pair (723a, 723b) is disconnected and the main power supply stops supplying power to the load circuits 820~82m. At this time, counter-electromotive force caused by the effects of the power supply being physically removed is cut out by the diode 830. The plurality of long pin pairs (720a~722a, 720b~722b) are also separated, and removal of the expansion device 800 is completed. Here, the design of the embodiment is such that it does not matter if the power supply capacity of the reserve charge power supply 120 is small compared to the main power supply 110. That is, the main power supply 110 is shared among a plurality of expansion devices connected to the system bus 100, which means that if the effects on the plurality of expansion devices are taken into consideration fluctuations caused by variation in load of the main power supply 110 must be avoided as much as possible. For this reason, the supply of power from the stable main power supply 110 should be supplied to an essential minimum of circuits, and at the time of insertion or removal, power is supplied only to the MOS switch 300 which demands reliable operation. On the other hand, various electronic circuits are included within the expansion device, and it can generally be said that the initial charging charge immediately before an expansion device is inserted is zero. If the main power supply 110 is directly connected to these electronic circuits, a surge current flows initially charging the electronic circuits, and there is a danger of fluctuations in the main power supply 110.

The reserve charge power supply 120 is arranged to prevent the above described fluctuations, and the reserve charge is carried out by the reserve charge power supply 120, and the structure is such that the main power supply 110 is connected after the surge current has been stabilized. In this embodiment, the structure is such that power is supplied from the reserve charge power supply 120 to the long pins, and from the main power supply to the short pins. For the above described reason, a designer will preferably design the capacity of the reserve charge power supply 120 taking into consideration the size of the surge current of the expansion device 800 so that fluctuations are made to be at a level that can be approved for the system configuration.

Another embodiment of an input/output device for connection and disconnection of active lines according to the present invention, and particularly which provides power to an expansion device, is shown in FIG. 3 and will be described below.

Figure 3A:
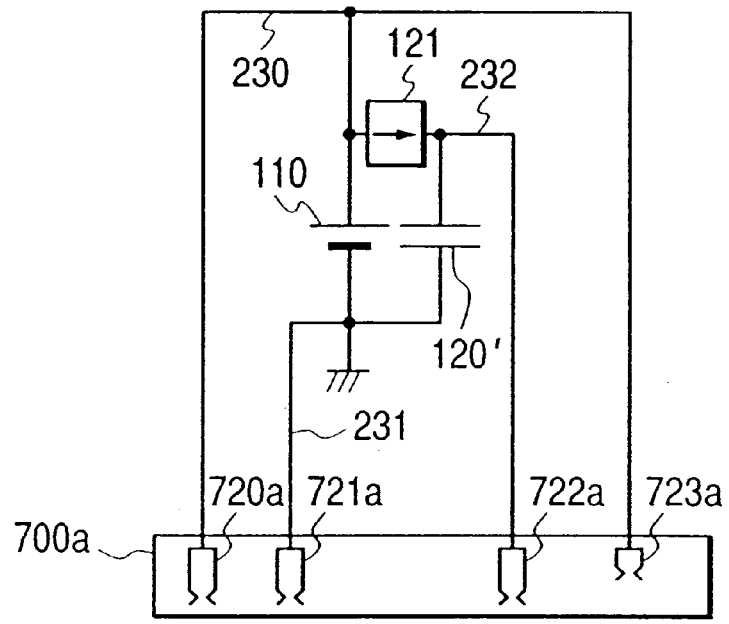
FIG. 3 shows one embodiment of a plurality of power supplies for supplying power to an expansion device.

FIG. 3(a) differs from the structure of FIG. 2 in that the reserve charge power supply 120 is replaced with a capacitor 120', and a surge current limiting circuit 121 has been added.

Figure 3B:
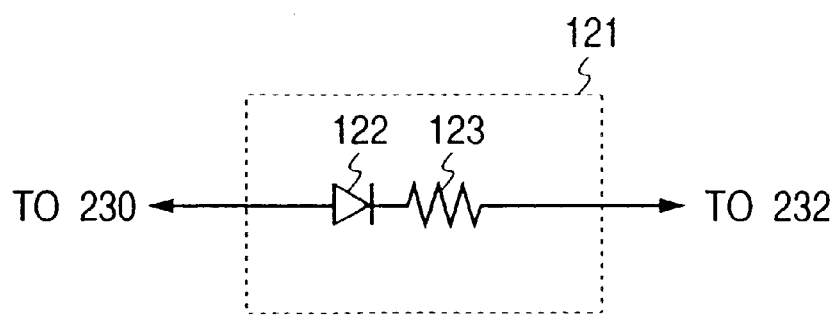

FIG. 3(b) shows the structure of the a surge current limiting circuit 121, and shows a diode 122 and a resistor 123 connected between a main power supply line 230 connected to the main power supply 110, and a reserve charge power supply line 232 connected to the capacitor 120'.

The feature of this embodiment is the reserve charge power supply 120 has been replaced by the capacitor 120' that is charged from the main power supply 110.

The behaviour of the two power supplies will now be described below. First of all, the capacitor 120' is charged from the main power supply 110 and is charged to approximately the same potential as the main power supply 110. When an expansion device 800 has been inserted, the initial charging current for the circuit loads inside the expansion device 800 is provided from the capacitor 120'. From FIG. 2 and FIG. 3, it can be seen that the instant the long pin pair (722a, 722b) are connected there is a transfer of electrical charge transfer across the capacitor 120' and the circuit loads 820~82m. After that, charging is carried out from the main power supply 110 at a time constant according to the resistor 123 and the combined capacitance of the capacitor 120' and the circuit loads 820~82m, until the long pin pair (723a, 723b) are connected. Accordingly, taking the previously mentioned time coefficient into consideration, fluctuations in the main power supply 110 caused by surge current can be prevented by giving the capacitor 120' a sufficiently large value.

Figure 4:
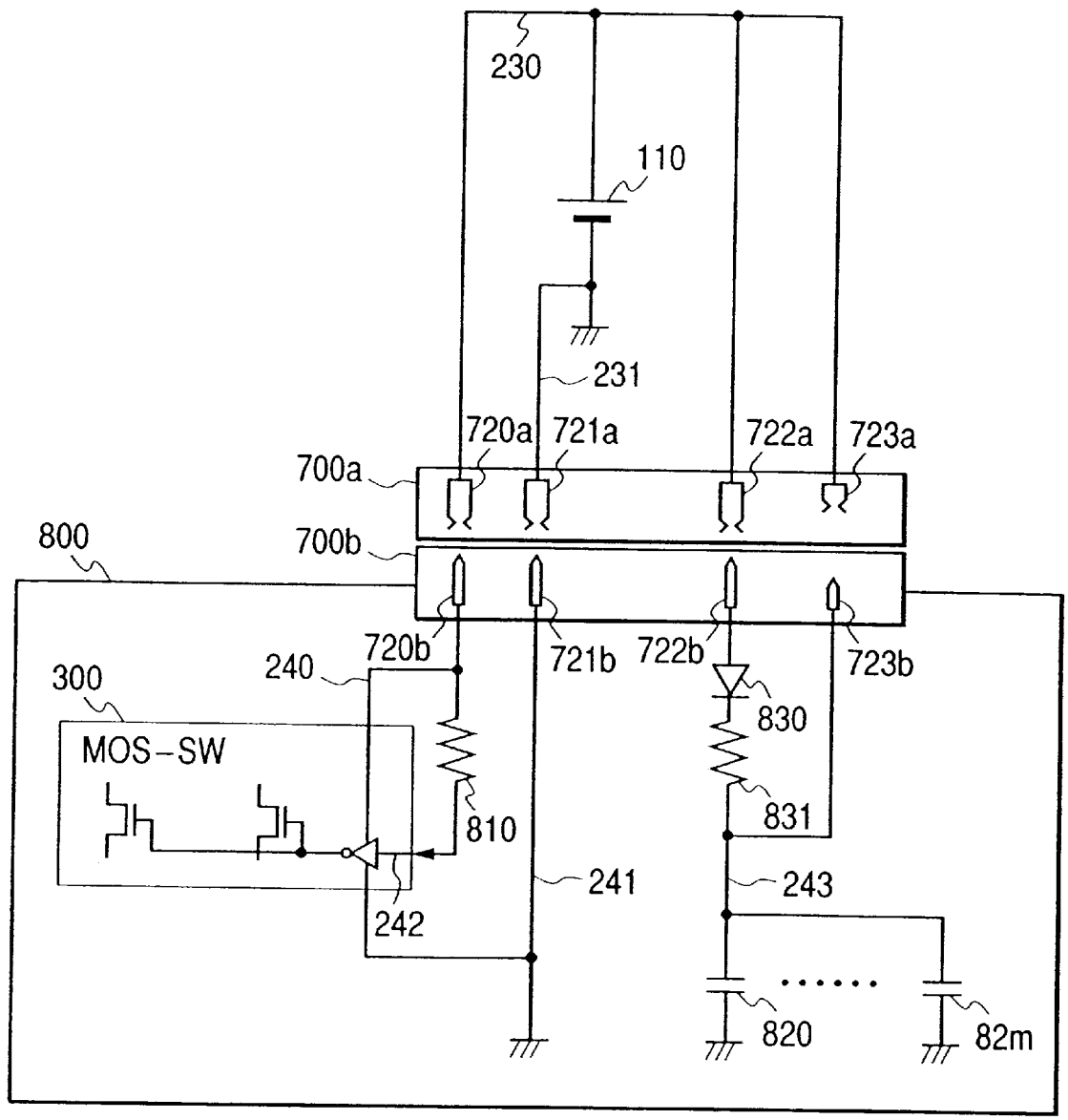
FIG. 4 shows another embodiment of an input output device supplying power to an expansion device.

Another embodiment of an input/output device for connection and disconnection of active lines according to the present invention, and particularly which provides power to an expansion device, is shown in FIG. 4 and will be described below.

Compared to the constructional elements shown in FIG. 2, the reserve charge power charge 120 has been removed in FIG. 3, and the resistor 831 is arranged in series with the diode 830. Also, there is a direct connection from the main power supply 110 to the pair of long pins (722a, 722b).

The feature of this embodiment is that the positive power supply section 240 for the input/output device (in this case the MOS switch 300) and the positive power supply section (in this case the circuit power supply section 243) for circuits other than the input/output device are separated inside the expansion device, and power is provided to the positive power supply section 240 and the circuit power supply section 243 from the main power supply 110.

A connection is made between the main power supply 110 and the circuit power supply section 243 via the pair of long pins (722a, 722b), the diode 830 and the resistor 831, and a connection is made between the main power supply 110 and the circuit power supply section 243 via the pair of short pins (723a, 723b), bypassing the diode 830 and the resistor 831.

The prevention of adverse effects caused by load variations being passed to the main power supply 110 when an expansion device 800 is inserted or removed will be described in the following.

When an operator inserts an expansion device 800, power is provided from the stable main power supply to the MOS switch 300 through the pair of long pins (720a~721a, 720b~721b). Maintaining the disabled state of the input/output lines of the MOS switch 300 by the stable main power supply is the same as has been described in the previous embodiments. At the same time, power is provided from the main power supply 110 to the circuit power supply section 243 through the pair of long pins 722a, 722b, the diode 830 and the resistor 831. Here, the main power supply 110 carries out reserve charging of the circuit loads 820~82m at a time coefficient determined by the resistor 831 and the combined capacitance of the circuit loads 820~82m. Further, when the expansion device has been inserted, power is provided from the main power supply 110 to the circuit power supply section 243 by the short pin pair (723a, 723b), and insertion of the expansion device 800 is completed.

When an operator removes an expansion device 800, first of all the short pin pair (723a, 723b) are separated, and the main power supply 110 stops providing power to the circuit loads 820~82m. At this time, a counter-electromotive force caused by the effects of disconnection of the power supply is cut out by the diode 830. A plurality of long pin pairs (720a~722a, 720b~722b) are also separated, and removal of the expansion device 800 is completed.

In the case of the embodiment in FIG. 4, compared to FIG. 2, there is no reverse charge power supply, and the resistor 831 is added as required. Because of this, a resistor 831 is preferably provided to limit surge current when the expansion device 800 is inserted, and the value of the resistor 831 is preferably made sufficiently large. However, it must be considered that before connection of the short pin pair (723a, 723b), it is necessary to sufficiently charge the circuit loads 820~82m, and a good balance must be set between an upper limit of the surge current and the size of a time coefficient.

Figure 5:
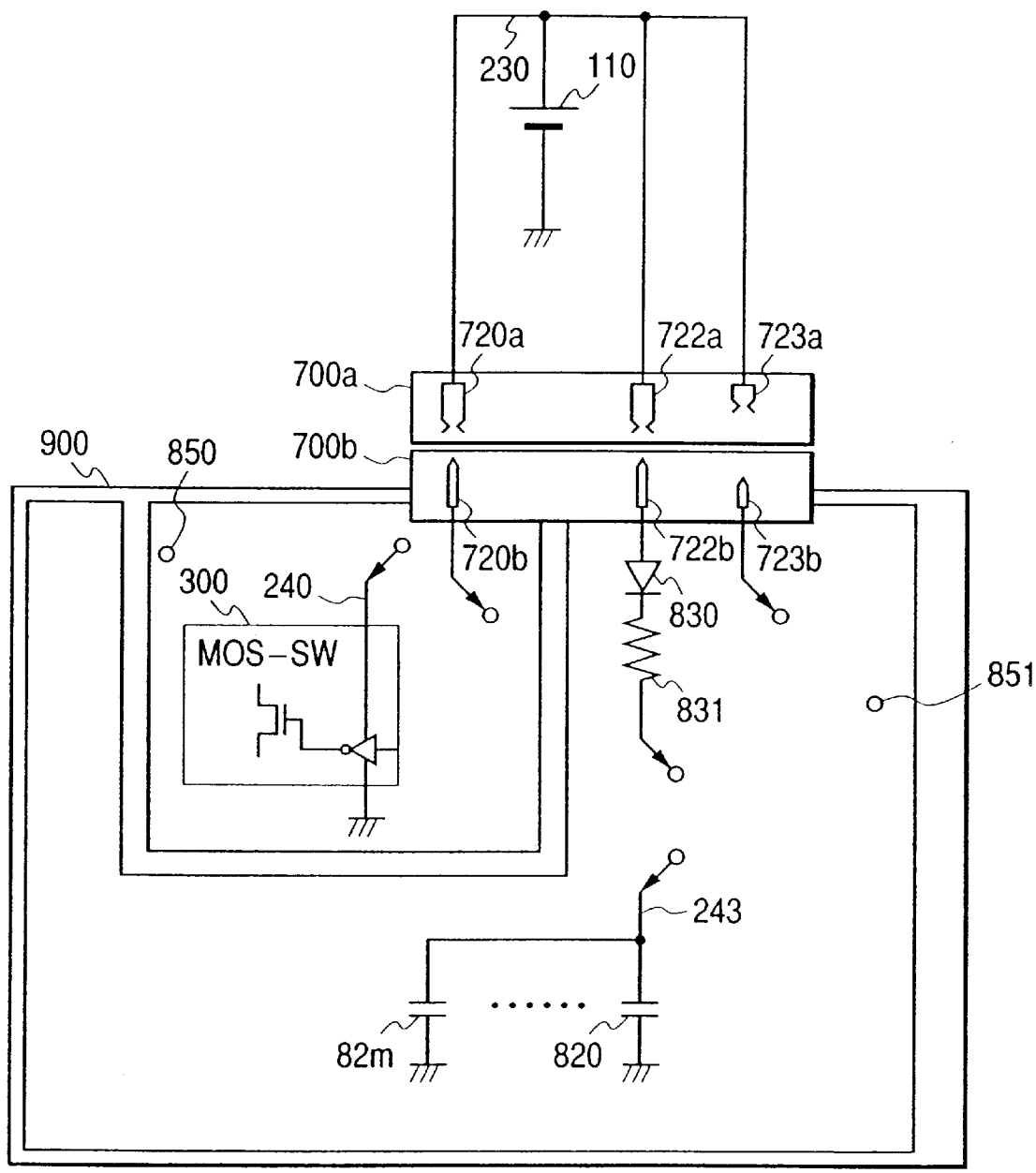
FIG. 5 shows an example of packaging independent power supply regions for expansion devices.

An example of implementation of an input/output device for connection and disconnection of active lines according to the present invention, and particularly which provides power to an expansion device, is shown in FIG. 5.

FIG. 5 can be applied to FIG. 2 or FIG. 4, and in this case the embodiment of FIG. 4 will be described.

The feature of this embodiment is that the positive power supply section 240 for the input/output device (in this case the MOS switch 300) and the positive power supply section for parts other than the input/output device (the circuit power supply section 243) are separated within the expansion device, and respective different positive power supply regions are provided on a printed substrate 900.

FIG. 5 shows that the long pin 720b and the short pin 723b are connected to respective positive power supply regions 850, 851 on the printed substrate 900 (these regions are shown as hatched regions in the drawing), and that a connection is made from the long pin 722b to the positive power supply region 851 through the diode 830 and resistor 831.

Because both power supply regions are provided separately, with a space (slit) that is not part of either power supply region being interposed between the positive power supply region for the input/output device 850 and the circuit load positive power supply region 851, the power supply regions are prevented from affecting the main power supply 110, and the effects of stopping fluctuations in the power supply are improved. Also, by using a multilayer printed substrate respective power supply regions can be provided on separate layers instead of on the same surface.

In this embodiment, because the input/output device power supply section 240 and the circuit power supply section 243 mutually interfere with the main power supply 110, the long pin pair (720*a*, 720*b*) and the long pin pair (722*a*, 722*b*) or the short pin pair (723*a*, 723*b*) are preferably arranged on the connectors (700*a*, 700*b*) so as to be physically separated as much as possible. If possible, the long pin pair (720*a*, 720*b*) and the long pin pair (722*a*, 722*b*) are disposed on the two ends of the connector.

Figure 6:
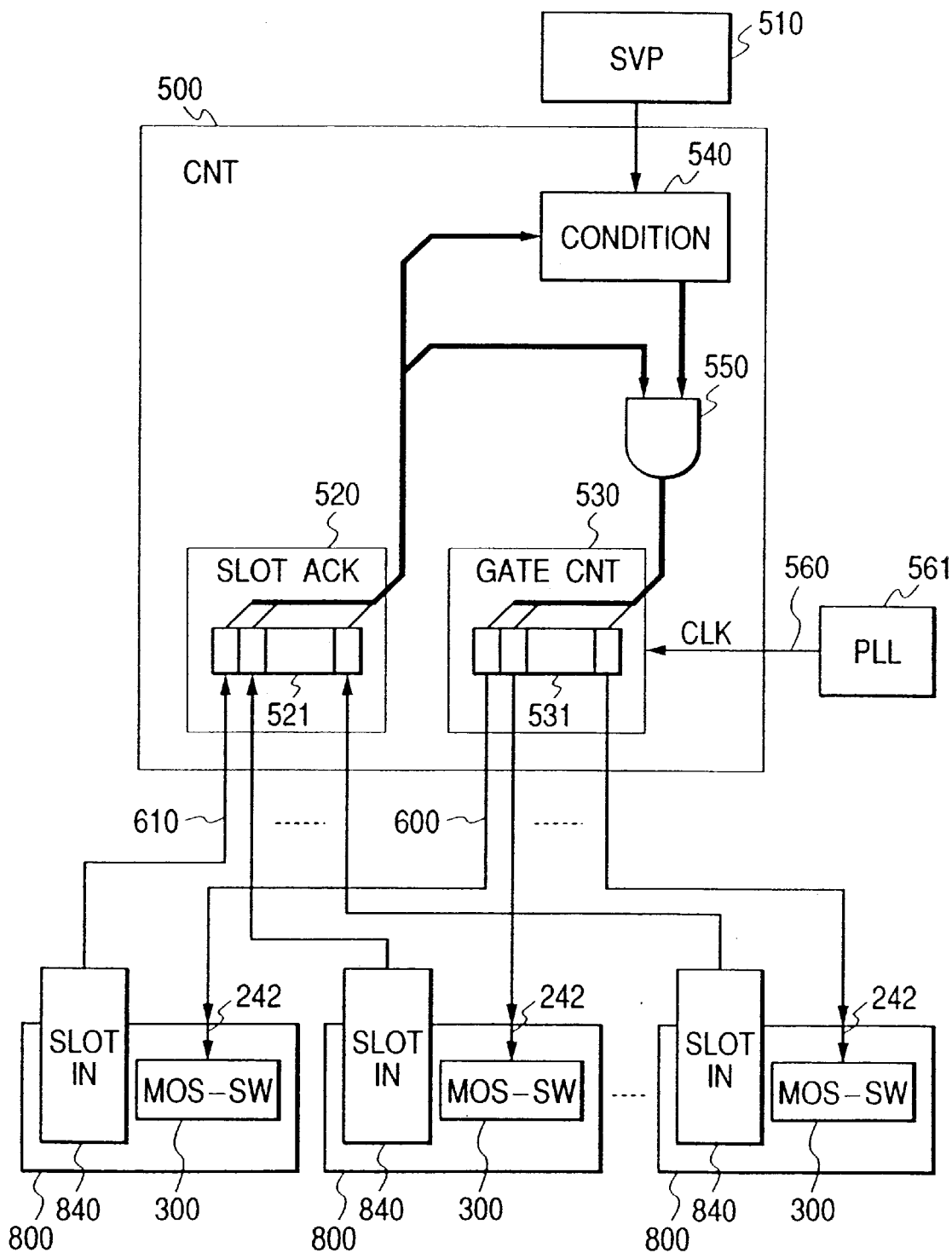
FIG. 6 shows one embodiment of a control device connected to a plurality of expansion devices.

An embodiment an input/output device of the present invention, and particularly a control device for carrying out open/close control of the MOS switch, is shown in FIG. 6.

FIG. 6 shows a control device 500 and sections of the expansion devices related to open/close control. In this drawing there are shown the control device 500 (CNT) for carrying out open/close control of the MOS switches 300, a service processor 510 (SVP) for supplying operator instructions to support operation of the control device 500, a connection monitoring section 520 (SLOT ACK) for monitoring a connection state of an expansion device 800, an open/close section 530 (GATE CNT) for carrying out the open/close operation of the MOS switches 300, a connection determination section 540 (CONDITION) for determining connection of the MOS switches 300, an operating instruction logic section 550, a reference signal generator 561 (PLL) for generating reference signal 560 by extracting a signal on the system bus 100, a control line 600 for transmitting open close control, a slot condition line 610 for transmitting a connection status of the expansion device 800, and a slot status output section 840 (Slot IN) for outputting a connection status of the expansion device 800.

The connection monitoring section 520 has a connection status register 521. The open/close section 530 has an open/close control register 531.

Operation of the control device 500 when an expansion device 800 is inserted will now be described below.

When an operator inserts an expansion device 800, if the expansion device is initially inserted on to the system bus 100, the fact that it has been inserted is notified from the slot status output section 840 to the control device 500 using the slot status line 610. If insertion of the expansion device 800 is sensed, the connection monitoring section 520 sets the status of the expansion device 800 in the connection status register 521 and passes an interrupt to the connection determination section 540. If a predetermined condition is satisfied, the connection determination section 540 that has received the interrupt issues a connection instruction to the operating instruction logic section 550. In this case, an instruction from the service processor 510, an interrupt generated after a fixed time has elapsed, or notification of completion of reset processing for the expansion device 800 concerned, etc. is the fixed condition, and the operating instruction logic section 550 preferably has means for confirming these, as required. The operating instruction logic section 550 writes "close" information for closing the MOS switch 300 to a region of the open/close register corresponding to the expansion device 800 that has been inserted, using signals from the connection determination section 540 and the connection monitoring section 520. The open/close section 530 selects a control line 600 of an expansion device 800 corresponding to the region that has been written to and drives the open/close control terminal 242 of the MOS switch 300 LOW. An inserted expansion device 800 is connected to the system bus 110 by the above described operation. A main processor for carrying out system management completes configuration control of the system bus 110, performs setting of the internal registers inside the relevant expansion device 800 etc, and after that the system switches to normal operation.

When an operator removes an expansion device 800, the MOS switch 300 of the expansion device 800 concerned must first of all be disconnected in order to minimize effects on the system bus 110 caused by the removal. To do this, the connection determination section 540 must first be informed of the expansion device 800 to be removed, and this can be done using a disconnection request interrupt from the main processor managing the system, an instruction input by the operator from the service processor 510, an error report interrupt from the expansion device 800 concerned, etc. The connection determination section 540 that has confirmed the expansion device 800 to be removed issues a command that the relevant expansion device 800 is to be disconnected to the operating instruction logic section 550. The operating instruction logic section 550 writes "open" information to a region of the open/close control register 531 corresponding to the expansion device being removed, using signals from the connection determination section 540. The open/close section 530 selects a control line 600 of the expansion device 800 corresponding to the region that has been written to, and drives the open/close control terminal 242 of the MOS switch 300 HIGH. An inserted expansion device 800 is disconnected from the system bus 110 using the above described procedure. Further, an expansion device that can be removed is physically disconnected from the system by an operator. A main processor for carrying out system management completes reconfiguration control of the system bus 110, performs setting of the internal registers inside the relevant expansion device 800 etc, and after that the system switches to normal operation.

Figure 7:
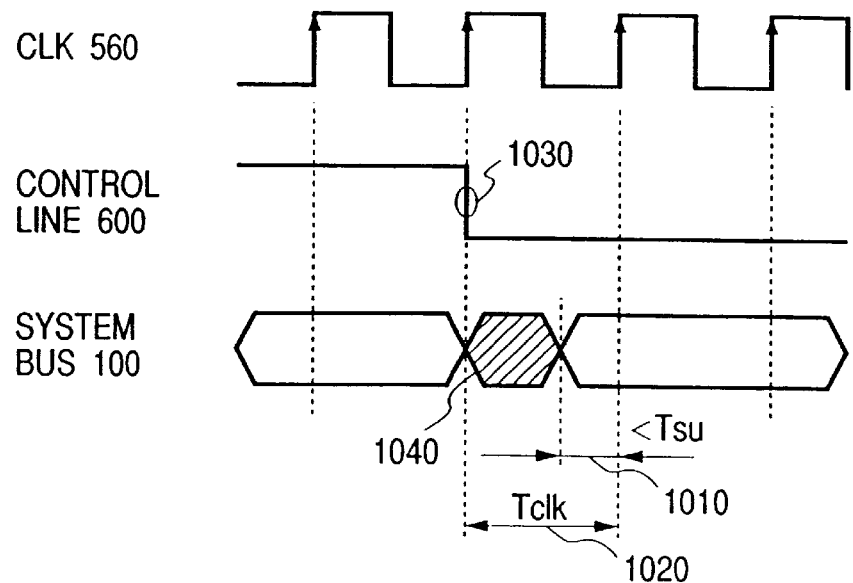
FIG. 7 shows a connection control timing sequence when logically connecting an expansion device to a system bus.

An embodiment of a method of connecting an input/output device of the present invention, and particularly an expansion device, to a system bus, is shown in FIG. 7, and will be described below.

In this embodiment, when the expansion device is physically connected or disconnected to or from the system bus, the timing of the connection or disconnection is set so that signal transmissions currently in progress on the system bus are not affected, and disturbance of the waveform is settled within a period which does not affect the extraction of signal from the bus.

FIG. 7 shows the timing of connecting an expansion device 800 to the system bus 100, and shows examples of operating waveforms of a reference signal 560, the control line 600 and the system bus 100. In this embodiment, a signal on the system bus 100 is defined and taken in on the rising edge of the reference signal 560. The period of the reference signal 560 of the system bus 560 is Tclk1020, and the required signal set up time on the system bus 100 is Tsu1010.

The reference signal 560 is connected to the open/close section 530 that drives the control line 600. To logically connect the open/close section 530 the electronic circuit 400 inside the expansion device 800 and to the system bus 100, the control line 600 is driven LOW. In this case the open/ close section 530 sets the control signal 600 LOW in synchronism with the rising edge of the reference signal 560 (1030). As a result, the MOS switch 300 is put in a conducting state, and since the electronic circuit 400 is connected to the system bus 100 signal disturbance occurs on the system bus (1040). However, even if signal disturbance occurs, if the signal wave form is settled before the rising edge of the next reference signal 560, i.e. within Tsu there will be no effect on the signal taken in at the rising edge of the reference signal 560. As a result, the control device 500 can connected the expansion device 800 without inhibiting signal transmission on the bus.

Figure 8:
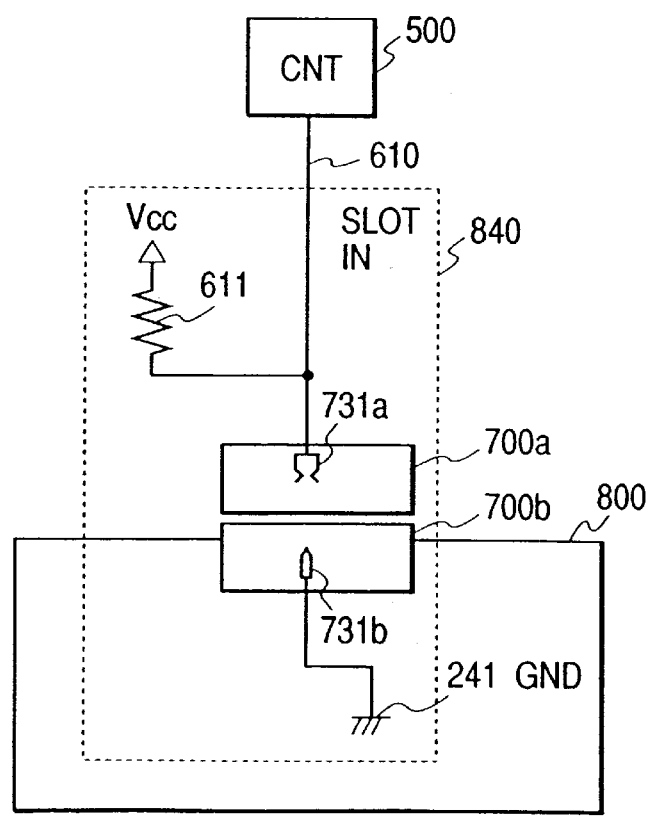
FIG. 8 shows one embodiment of a device notifying that an expansion device has been inserted onto a system bus.

An embodiment of an input/output device realizing connection and disconnection of active lines of the present invention, and particularly a slot status output section for notifying that an expansion device has been inserted, is shown in FIG. 8, and will be described in the following.

FIG. 8 shows one structural example of a slot status output section 840. The slot status output section 840 is provided between the expansion device 800 and the control device 500, and a slot status line 610 is connected to a negative power supply line 241 within the expansion device 800, via a pair of short pins (731a, 731b). The slot status line 610 is also connected to a positive power supply section, for example the main power supply section 230, via a resistor 611 inside the expansion device 800.

The operation of the slot status output section 840 when an expansion device 800 is inserted will now be described below.

Before an operator insert an expansion device 800, the slot status line 610 outputs HIGH because it is pulled up by resistor 611 connected to the positive power supply. This enables the control device 500 to confirm that there is no expansion device 800 connected on the system bus 100. When the operator inserts the expansion device 800, the plurality of long pin pairs are connected, and after the power supply potential has been defined the short pin pairs are connected. If the short pin pair (731a, 731b) is connected the slot status line 610 is connected to the negative power supply section 241 and LOW is output. As a result, the control device 500 confirms that the expansion device 800 has been inserted onto the system bus 100.

When an expansion device 800 is removed, the situation is the reverse to that described above, and before removal the slot status line 610 is outputting LOW. Removal of the expansion device 800 causes HIGH to be output, and as a result of this the control device 500 confirms that the expansion device 800 has been removed.

Figure 9:
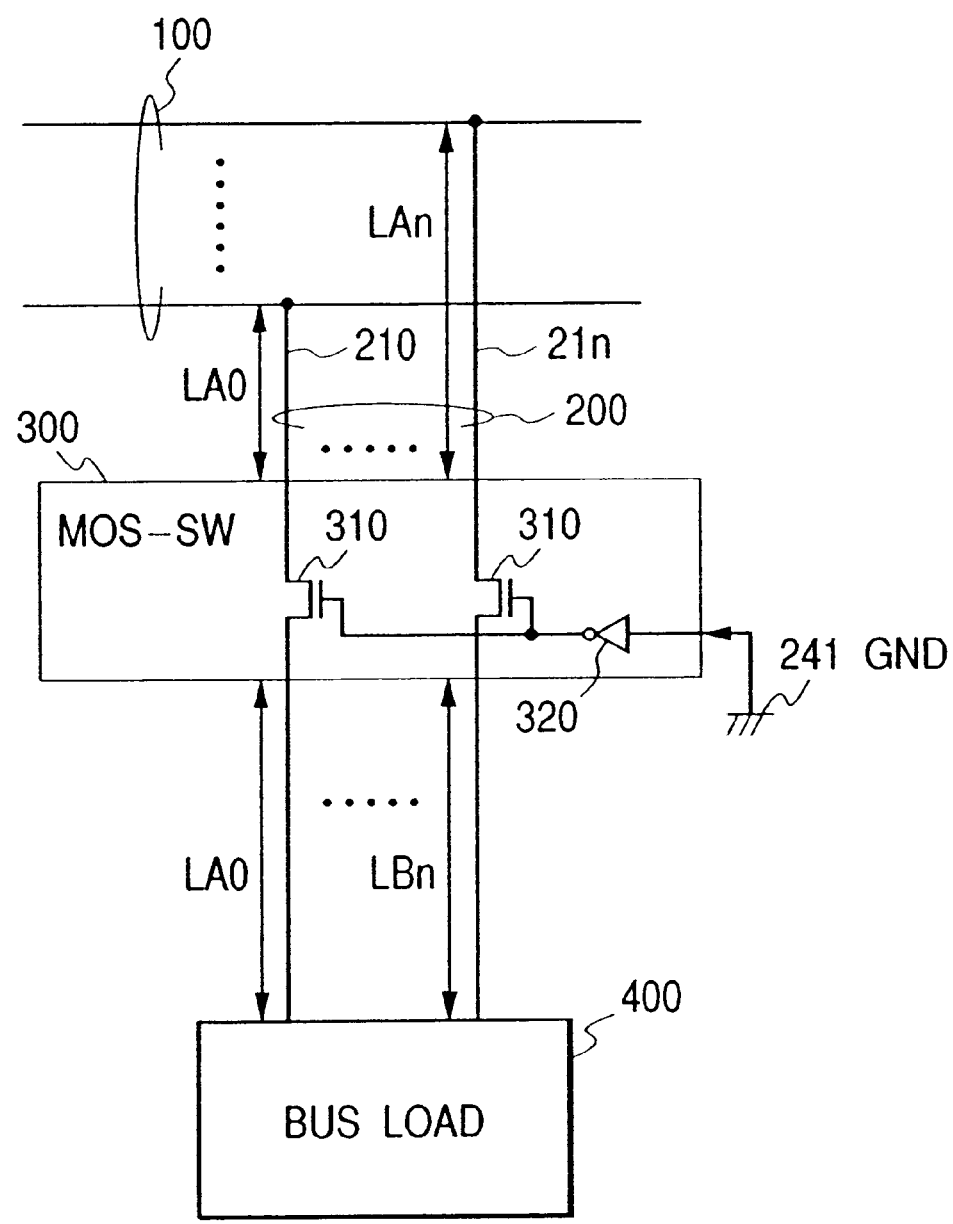
FIG. 9 shows one embodiment of an input/output device using transfer gates.

FIG. 9 shows one embodiment of an input/output device of the present invention, which will be described in the following.

FIG. 9 shows a system bus 100 having a plurality of signal lines, a tap 200 which is a branch off the system bus 100, a MOS switch 300 (MOS-SW), and an electronic circuit 400 (BUSLOAD) capable of operating by direct connection to the bus.

The technical concept of the present invention is to reducing the settling time of signal waveforms on a bus when a conventional electronic circuit is directly connected to a bus and reducing waveform fluctuation by inserting a MOS switch between the bus and the electronic circuit and disposing the MOS switch 300 as close to the bus as possible, and making electronic circuits in which signal wiring from a conventional bus is restricted in length more capable of being disconnected than in the related art.

Since the MOS switch 300 is always enabled, the input of an open/close control driver 320 is connected to the negative power supply 241 via a resistor.

With regard to the respective lengths LA1~LAn of each signal line 210~21n including the tap 200, the lengths are made as short as possible for the implementation. When the MOS switch 300 has been enabled, signals to be transmitted on the system bus are generally subject to the effects of reflection from 3 places, i.e. (1) from the pins of the MOS switch 300 on the side of the system bus 100, (2) from the pins of the MOS switch 300 on the side of the electronic circuit 400, and (3) from the output pins of the electronic circuit 400. In this embodiment, since the worst effects on the bus signal transmission waveforms are caused by the lengths LA1~LAn of (1), reduction in (1) contributes greatly to settling the bus signal waveforms. The upper limit of the lengths LA1~LAn is determined to be in a range in which signal logic can be correctly transmitted by associated electronic circuits 400, taking into consideration the effects of operating frequency and reflection etc. of the system bus 100 and the total extension of the system bus 100, etc.

For example, a bus system employing 5v, or more specifically in a bus system with specifications of a bus propagation time of less than 11 ns, bus characteristic impedance of 60~100 (, electronic circuit input pin capacitance of less than 16 pF, and a maximum number of connected circuits being 10, the lengths LA1~LAn are from) to 1.5 inches, but when the electronic circuits are packaged, wiring in the normal way is difficult.

Even when the maximum number of electronic circuits 400 are connected, the MOS switches 300 are disposed between respective electronic circuits and the system bus 100 with the lengths LA1~LAn being between 0 and 1.5 inches so as to secure the HIGH level and LOW level of the signal waveform within the bus propagation time. In this case, the electronic circuits do not need to be on the same backplane as system bus 100. By making the input pin capacitance of the MOS switch 300 small compared to the electronic circuits, it is possible for the method of the present invention to have a larger number of connections than can be achieved by simply connecting electronic circuits 400 to the system bus, even in the case where the electronic circuits are for expansion devices on a different backplane.

On the other hand, by arranging the MOS switches 300 close to the system bus and satisfying the bus specifications, the electronic circuits 400 can be wired with lengths LB1~LBn of more than 1.5 inches, but preferably less than 10 inches.

As has been described above, by distributing the MOS switch 300 between the electronic circuits 400 and the system bus 100 within a range taking the effects of reflection into consideration, signals output from the electronic circuits are output onto the system bus 100 by way of transfer gates 310 of the MOS switches 300, and at this time signals on the system bus are mainly effected by reflections from both ends of the system bus 100 and from the input terminals of other MOS switches 300. Multiple reflections of bus signals is suppressed by making the lengths LA1~LAn short, and accordingly the bus signal waveforms are converged and settled rapidly, and high speed bus applications are possible.

INDUSTRIAL APPLICABILITY

According to the present invention, an input output device capable of connecting and disconnecting active lines can be realized in which insertion or removal of an expansion device does not upset transmission of bus signals for other electronic circuits on a bus capable of high speed operation, because disabling is ensured at the time of insertion or removal using transfer gates of small signal delay in the input/output circuit.

Further, according to the present invention, it is possible to realize an input/output device capable of connecting and disconnecting active lines in which there are multiple power supplies, the effects on a power supply at the time of insertion or removal are reduced, and the operation of electronic circuits that are not involved in the insertion or removal does not become unstable.

Still further, the input/output device of the present invention can be applied to a high speed bus because the bus operation waveform is rapidly settled by arranging inputs of transfer gates at positions that are a fixed short distance from a bus constituted by the input/output sections of electronic circuits.

We claim:

1. A control device capable of connecting and disconnecting with an expansion device, comprising:

a connection monitoring section to establish connection status of the expansion device to a connection status register when the expansion device is connected, and to output an interrupt signal based on the established connection status;

a connection determination section to output a connection signal based on the interrupt signal and a predetermined condition;

an operating instruction section to form close information to close an open/close control element to control signal transmission of electric circuits in the expansion device based on the connection signal and interrupt signal, and to output the close information; and an open/close section comprising an open/close control register to store control information of the open/close control element, wherein the operating instruction section establishes the close information to the open/close control register of the open/close section, and wherein the open/close section outputs the established close information to the connected expansion device.

2. A control device according to claim 1, wherein the connection determination section outputs a disconnection signal that the expansion device is to be disconnected, wherein the operating instruction section forms open information to open the open/close control element, and establishes the open information to the open/close control register, and wherein the open/close section outputs the established open information to the expansion device.

3. A control device capable of connecting and disconnecting with an expansion device, comprising:

a connection monitoring means for establishing a connection status of the expansion device to a connection status register when the expansion device is connected, and for outputting an interrupt signal based on the established connection status;

a connection determination means for outputting a connection signal based on the interrupt signal and a predetermined condition;

an operating instruction means for forming close information for closing an open/close control means for controlling signal transmission of electric circuits in the expansion device based on the connection signal and interrupt signal, and for outputting the close information; and an open/close means comprising an open/close control register means for storing control information of the open/close control means, wherein the operating instruction means establishes the close information to the open/close control means of the open/close means, and wherein the open/close means outputs the established close information to the connected expansion device.

4. A control device according to claim 3, wherein the connection determination means outputs a disconnection signal that the expansion device is to be disconnected, wherein the operating instruction means forms open information for opening the open/close control means, and establishes the open information to the open/close control register means, and wherein the open/close means outputs the established open information to the expansion device.

* * * * *